United States Patent
Nishizawa et al.

[11] Patent Number: 5,864,101
[45] Date of Patent: Jan. 26, 1999

[54] LIFT CONTROL MECHANISM AND METHOD

[75] Inventors: Kazumi Nishizawa; Yutaka Izumida, both of Tokyo; Hitoshi Fujisawa, Kanagawa, all of Japan

[73] Assignees: Pabco Co., Ltd, Kanagawa; Nikko Electric Industry Co., Ltd., Tokyo, both of Japan

[21] Appl. No.: 825,562

[22] Filed: Mar. 31, 1997

[30] Foreign Application Priority Data

Sep. 25, 1996 [JP] Japan .................................. 8-272913

[51] Int. Cl.⁶ ................................ B66B 1/28; B60P 1/00
[52] U.S. Cl. .......................... 187/285; 187/222; 414/557
[58] Field of Search ..................... 187/222, 224, 187/233, 234, 240, 285; 414/557–550

[56] References Cited

U.S. PATENT DOCUMENTS

| | | | |
|---|---|---|---|
| 3,614,567 | 10/1971 | Payne et al. | 318/305 |
| 4,517,645 | 5/1985 | Yuki et al. | 364/424 |
| 4,520,443 | 5/1985 | Yuki et al. | 364/424 |
| 4,957,408 | 9/1990 | Ohkura | 414/635 |

*Primary Examiner*—Robert Nappi
*Attorney, Agent, or Firm*—Majestic, Parsons, Siebert & Hsue P.C.

[57] ABSTRACT

A lift attached to a truck has a tail gate supported by at least one hydraulic lift and at least one tilt cylinder for respectively lifting the tail gate as a whole and rotating it for opening and closing. A control system for moving such a tail gate up and down as a whole and rotating it to open and close it is provided with a power unit including a hydraulic pump, an electric motor for the hydraulic pump, and a plurality of valves for selectably allowing or not allowing transport of a hydraulic liquid by the hydraulic pump into the hydraulic cylinders, a sensor for measuring the slope angle of the tail gate, external switches, and a controller which serves to transmit output signals to the motor and to the valves in response to input signals from the sensor and the external switches and is capable of stopping rotary motion of the tail gate at a horizontal position irrespective of the slope of the vehicle and starting and stopping the rotary motion of the tail gate gradually.

9 Claims, 9 Drawing Sheets

LIFT CONTROL MECHANISM AND METHOD

BACKGROUND OF THE INVENTION

This invention relates to the control of a lift of the kind attached to a back part of a freight truck for transporting freight up into and down from the truck. More particularly, the invention relates to a mechanism and a method of control for the opening and closing of the truck's tail gate.

Figure 2A:
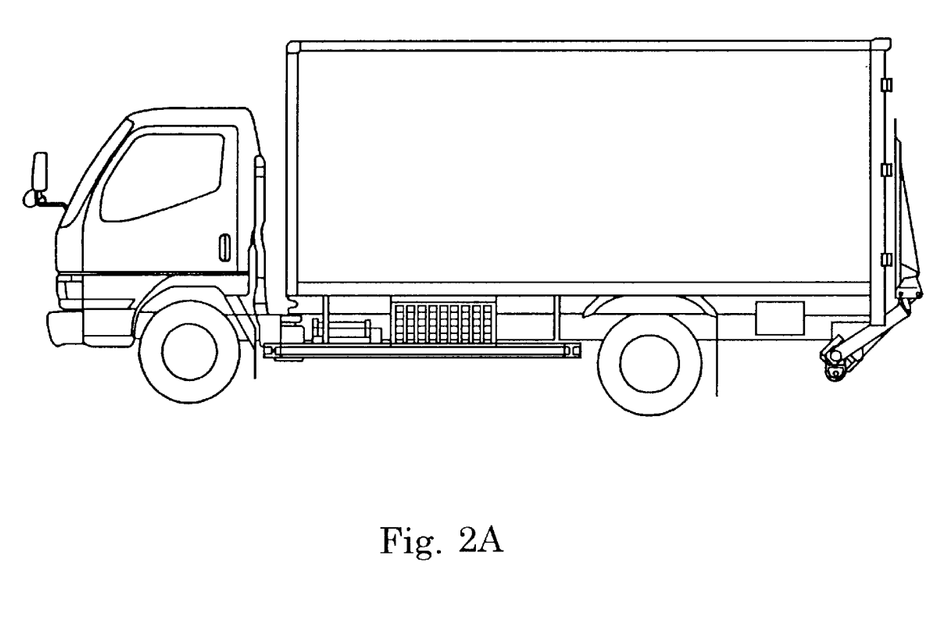
FIGS. 2A and 2B are side and back views of a truck with a freight lift which is controlled by a mechanism and method according to this invention.
Figure 2B:
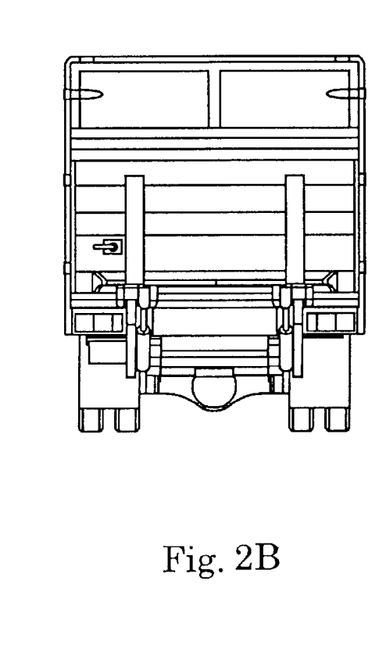

FIGS. 2A and 2B show a lift of this general type attached to a back part of a freight truck. Such a lift generally makes use of a parallel link mechanism comprising a plurality of cylinders to open and close a freight-receiving table (herein referred to as the tail gate), as well as moving it up and down as a whole.

Explained more in detail with reference to FIGS. 3A, 3B, 3C and 3D, a gate-opening mechanism 30 of such a lift for opening and closing a tail gate 31 (that is, a mechanism for rotating the tail gate 31 around an axis between a closed position and an open position), a tilt cylinder 32 with a piston, a main arm 36 and an attachment bracket 38. The tip of the piston of the tilt cylinder 32 is axially connected to the tail gate 31 through a pin 34, and the other end of the tilt cylinder 32 is axially connected to the bracket 38 through another pin 39. Similarly, one end of the main arm 36 is axially connected to the tail gate 31 through a pin 33, and the other end is axially connected to the bracket 38 through another pin 35. The attachment bracket 38 is welded to the chassis 37 of the truck.

The aforementioned rotary (or tilting) motion of the tail gate 31 is generally effected by means of a pair of left-hand and right-hand tilt cylinders, of which only one is shown in FIGS. 3A, 3B, 3C and 3D. Their motion is controlled by a power unit comprising hydraulic pumps, electric motors for operating these pumps and solenoid valves, as well as an electric control unit.

The tail gate of a kind structured as generally shown in FIGS. 2, 3A, 3B, 3C and 3D is usually designed so as to be parallel to the ground when it is stopped at its opened position. When the truck is parked on the ground which is sloped in the forward or backward direction, therefore, not only is it difficult but also dangerous to load or unload a cargo by using such a tail gate remaining parallel to the sloped ground. In other words, loading and unloading could not be done with high efficiency by using such a lift unless the ground was flat.

The tail gate of a prior art lift is adapted to rotate at a same speed whether it is opening or closing. This means that it starts and stops its motion suddenly, making it likely to damage a fragile cargo. Sudden movements of the tail gate are also a problem to be considered from the point of view of safety to the workers.

Another disadvantage of a prior art lift of this type has been the lengths of the oil pipes between the cylinders and the valves. If there is a damage to a pipe, the loss of pressure inside a cylinder cannot be prevented even if valves are closed, and this could lead to a serious accident.

SUMMARY OF THE INVENTION

It is therefore an object of this invention to provide an improved control system and method for a lift of this type capable of stopping the tail gate horizontally, independent of the slope of the ground where the truck is parked.

It is another object of this invention to provide such a control system and method capable of starting and stopping the motion of the tail gate less abruptly so as to improve the safety of the operation and to reduce the damage to the cargo.

It is still another object of the invention to provide such a control system and method capable of controlling the speed of opening and closing the tail gate according to the sloping angle of the truck.

It is a further object of this invention to provide such a control system and method capable of preventing a sudden drop in pressure inside a cylinder due to a damage to an oil-transporting pipe or the like.

A control system embodying this invention, with which the above and other objects can be accomplished, may be characterized as comprising a power unit including a hydraulic pump, an electric motor for the hydraulic pump, and a plurality of valves for selectably allowing or not allowing transport of a hydraulic liquid into the hydraulic cylinders by the hydraulic pump, a sensor for measuring the slope angle of the tail gate, external switches, and a controller which serves to transmit output signals to the motor and to the valves in response to input signals from the sensor and the external switches and is capable of stopping rotary motion of the tail gate at a horizontal position irrespective of the slope of the vehicle and starting and stopping the rotary motion of the tail gate gradually.

According to a preferred embodiment of the invention, the aforementioned plurality of valves include a main valve, a tilt valve and a lift valve. The main valve is disposed between the hydraulic pump and each of the hydraulic cylinders. The tilt valve is disposed between the main valve and the tilt cylinder and near the tilt cylinder and is directly connected to the tilt cylinder. The lift valve is disposed between the main valve and the lift cylinder and proximally to the lift cylinder and is directly connected to the lift cylinder. The controller, according to a preferable embodiment, includes a signal generating device for generating a rectangular wave signal according to an input signal received from the sensor, and a semiconductor switch which switches on and off in synchronism with the rectangular wave signal, so as to be capable of changing the duty ratio of the rectangular wave signal to adjust the speed of the motor for controlling the rotary speed of the tail gate.

A method of this invention for using such a control system to open the tail gate may be characterized as comprising the steps of slowly starting the tail gate to rotate from a closed position and gradually increasing its rotational speed, decelerating the rotary motion in response to a signal from the sensor when the slope angle of the tail gate from a horizontal direction becomes less than a specified magnitude, and stopping the rotary motion in response to another signal from the sensor when the tail gate has become horizontal such that the tail gate is always stopped at the horizontal direction irrespective of the slope of the truck.

A method of this invention for using such a control system to close the tail gate may be characterized as comprising the steps of slowly starting the tail gate to rotate from an opened position and gradually increasing its rotational speed, and decelerating the rotary motion in response to a signal from the sensor when the slope angle of the tail gate from a horizontal direction becomes greater than a specified angle.

If the slope angle of the tail gate is measured before the aforementioned opening motion is started and this measured initial slope is stored, this angle may be referenced when the closing motion of the tail gate is stopped.

In these methods of control, the acceleration and deceleration in the rotary motion of the tail gate may be effected by changing the duty ratio of a rectangular wave signal or the voltage of power supplied to the motor which activates the hydraulic pump.

BRIEF DESCRIPTION OF THE DRAWINGS

The accompanying drawings, which are incorporated in and form a part of this specification, illustrate embodiments of the invention and, together with the description, serve to explain the principles of the invention. In the drawings.

Throughout herein, the same or comparable components and steps are indicated by the same numerals for convenience.

DETAILED DESCRIPTION OF THE INVENTION

Figure 1:
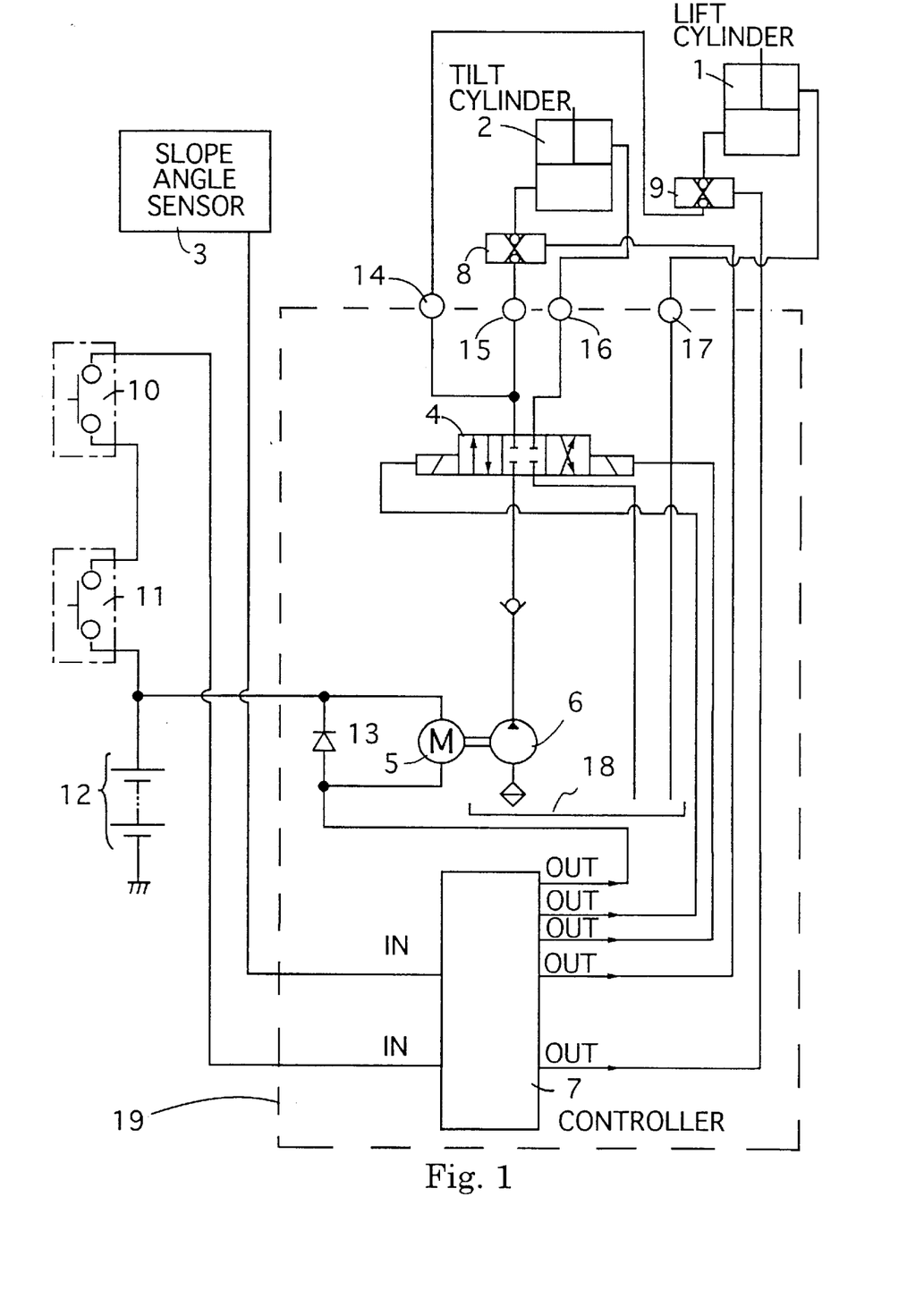
FIG. 1 is a system circuit diagram of a control unit embodying this invention for controlling the operation of a freight lift.

FIG. 1 is a system circuit diagram of a control unit according to a preferred embodiment of this invention for controlling the opening and closing motion of a tail gate of a lift which is supported by at least one hydraulic cylinder for moving it up and down as a whole (referred to as the lift cylinder 1) and at least one other hydraulic cylinder for rotating it around a horizontal axis, or tilting it (referred to as the tilt cylinder 2) to thereby open and close it. The system further includes a hydraulic pump 6, an electric motor 5, a slope angle sensor 3, a controller 7, a main valve 4, a tilt valve 8, a lift valve 9, external switches 10 and 11, a power source 12, a flywheel diode 13, ports 14, 15, 16 and 17, and an oil tank 18. The hydraulic pump 6, the motor 5, the main valve 4 and the controller 7 may be considered to together form a power unit 19 serving as the power source for the lift cylinder 1 and the tilt cylinder 2, respectively for the lifting and rotary (or tilting) motions of the tail gate. Both the lift cylinder 1 and the tilt cylinder 2 are a hydraulic cylinder, each serving to cause its piston to undergo a reciprocating motion by means of a hydraulic operating liquid (referred to as "the oil") supplied through the hydraulic pump 6. The main valve 4, the tilt valve 8 and the lift valve 9 are each a solenoid valve, controlled by signals outputted from the controller 7. One end of the tilt valve 8 is connected to one of the oil chambers of the tilt cylinder 3, and its other end is connected to the main valve 4. One end of the lift valve 9 is connected to one of the oil chambers of the lift cylinder 1, and its other end is connected to the main valve 4. The slope angle sensor 3 comprises an electrostatic element for sensing the slope angle from the horizontal direction, being an analog element adapted to vary the level of its output signals according to the detected slope angle. The slope angle sensor 3 is disposed near the tip of the tail gate, with one end connected to an input terminal of the controller 7. The external switches 10 and 11 are connected in series such that the operation of the system as a whole will stop if either of them is switched off. They may be ordinary button switches, one of them set to be operated from the driver's seat and the other set at a back part of the truck. The number of the external switches is not intended to limit the scope of the invention. There may be only one external switch, while there may also be three or more of them connected in series. The controller 7 has many functions, as will be described in detail below, and is adapted to transmit control signals to the motor 5, the main valve 4, the tilt valve 8 and the lift valve 9 in response to signals received from the slope angle sensor 3 and the external switches 10 and 11. The flywheel diode 13 is for the purpose of absorbing the surge voltage immediately after the motor 5 is switched off. The motor 5 and the hydraulic pump 6 are connected by means of a coupler.

When the motor 5 activates the hydraulic pump 6, the oil in the oil tank 18 is selectably passed through the port 14 or 15 and the lift valve 9 or the tilt valve 8 into one of the chambers inside the lift cylinder 1 or the tilt cylinder 2 to push its piston outward. The oil which is then pushed out of the other chamber is returned through the port 16 or 17 back to the oil tank 18 either directly or through the main valve 4.

One of the distinct characteristics of the control system according to this invention is that use is made of a slope angle sensor adapted to transmit to the controller 7 an analog signal indicative of the sloping angle of the truck body when it is parked or that of the tail gate when it is being opened or closed. As will be described in detail below, the controller 7 responds to signals from the slope angle sensor 3 and controls on real time the motor 5, the main valve 4, the tilt valve 8 and the lift valve 9.

Another characteristic of the control system of this invention is that the controller 7 cooperates with the slope angle sensor 3 to cause the tail gate to always stop in a horizontal orientation, independent of the slope angle of the truck body, and to always start or end its opening or closing motion gradually.

A third characteristic of this control system is that there are as many as three valves (that is, the main valve 4, the tilt valve 8 and the lift valve 9) of which the tilt valve 8 and the lift valve 9 are disposed near the tilt cylinder 2 and the lift cylinder 1, respectively, directly connected to one of the oil chambers therein. With the valves thus provided, the two cylinders can be controlled independently of each other and, even if a crack is generated in a oil pipe, accidents due to a sudden drop in the hydraulic pressure can be prevented.

Figure 4:
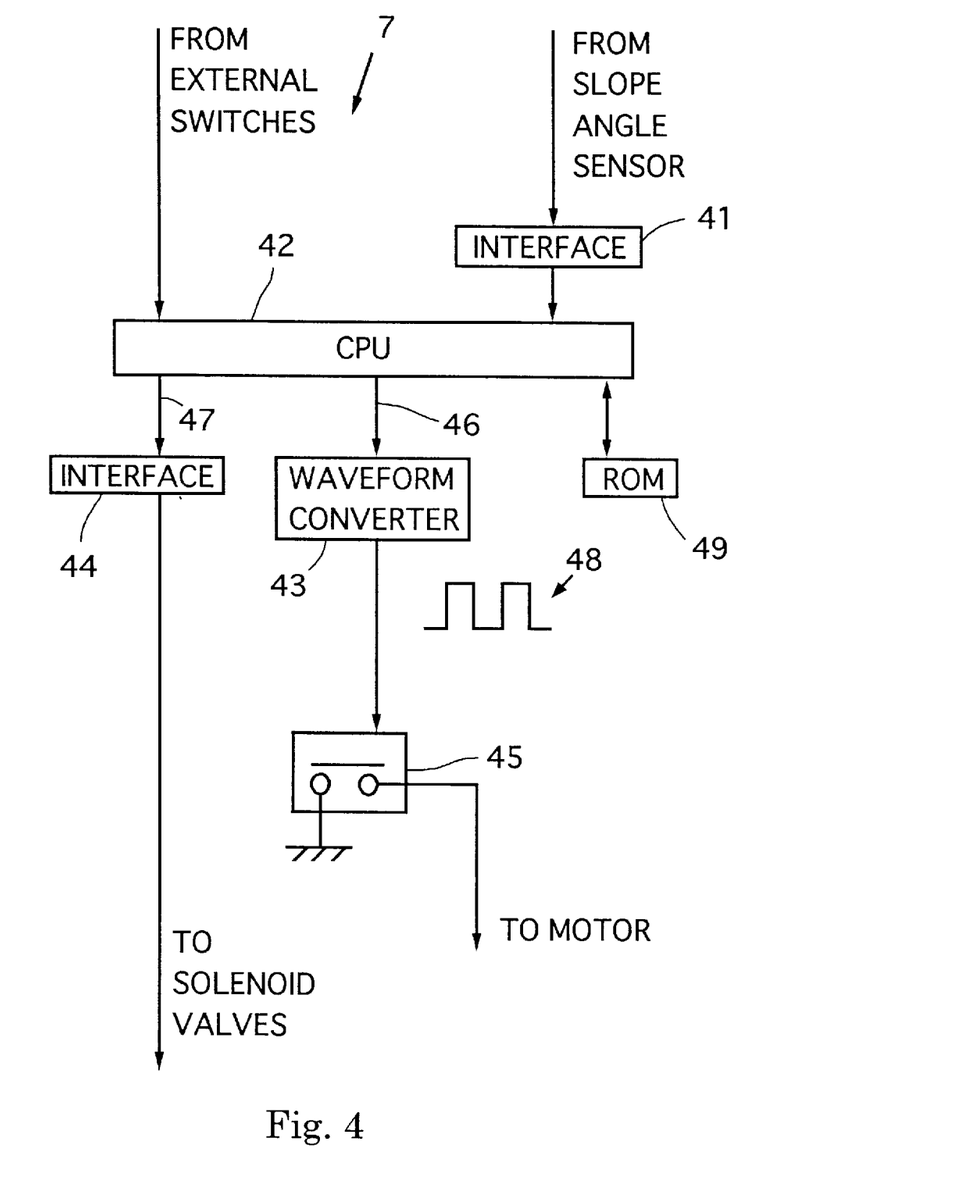
FIG. 4 is a block diagram of the controller of FIG. 1.

As shown in FIG. 4, the controller 7 comprises a central processing unit (CPU) 42, a waveform converter 43, a semiconductor switch 45, a memory (ROM) 49 and interfaces 41 and 44. Analog signals from the slope angle sensor 3 are converted by the interface 41 into digital signals and are inputted to the CPU 42. ON/OFF signals from the external switches 10 and 11 are also received by the CPU 42. The CPU 42 responds to the signals from the slope angle sensor 3 according to a program preliminarily stored in the memory (ROM) 49 by outputting signals 46 and 47 respectively for controlling the motor 5 and the solenoid valves 4, 8 and 9. The signal 46 for controlling the motor 5 is converted into a rectangular wave 48 by the waveform converter 43. The signals 47 for controlling the valves are transmitted to the solenoid valves 4, 8 and 9 through the interface 44. The rectangular wave 48 formed by the waveform converter 43 is adapted for the switching of the semiconductor switch 45. The frequency of the rectangular wave 48 matches completely the switching frequency of the semiconductor switch 45, they being in synchronism with each other.

Figure 5A:
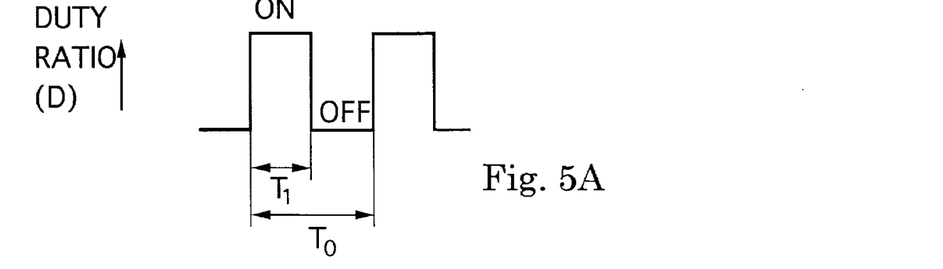
FIGS. 5A, 5B, 5C and 5D are waveform diagrams for showing the principle of controlling the rotational speed of the motor of FIG. 1 according to this invention.
Figure 5B:
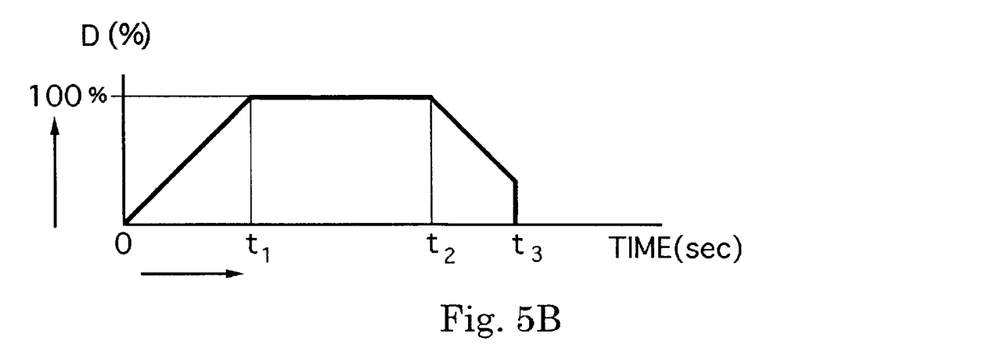

The principle of controlling the rotational speed of the motor 5 by the controller 7 is explained next with reference to FIGS. 5A, 5B, 5C and 5D. FIG. 5A shows a portion of the rectangular waveform generated by the waveform converter 43 shown in FIG. 4. The hill parts of the wave correspond to the periods during which the power source for the motor is on, and the valley parts correspond to the periods during which the power source for the motor is off. In FIG. 5A, $T_0$ represents the period of the wave, and $T_1$ represents the duration of each power-on period. Duty ratio in percentage unit is defined by $D=100 T_1/T_0$ and represents the average value of the inputted voltage. If a source of 200V is used with duty ratio of 50%, for example, the average input voltage is 100V. The duty ratio of a rectangular wave can be changed by varying its frequency. Since the rotary speed of a DC motor changes in proportion with the applied voltage, it is possible to control the rotary speed of a motor by controlling the duty ratio of a rectangular wave. This principle is used according to this invention in controlling the opening and closing motion of the tail gate of a lift. FIG. 5B shows the change in the duty ratio with time as the tail gate is opened and closed. Next, the opening of the tail gate according to this invention will be explained with reference to both FIGS. 3 and 5B.

Figure 3A:
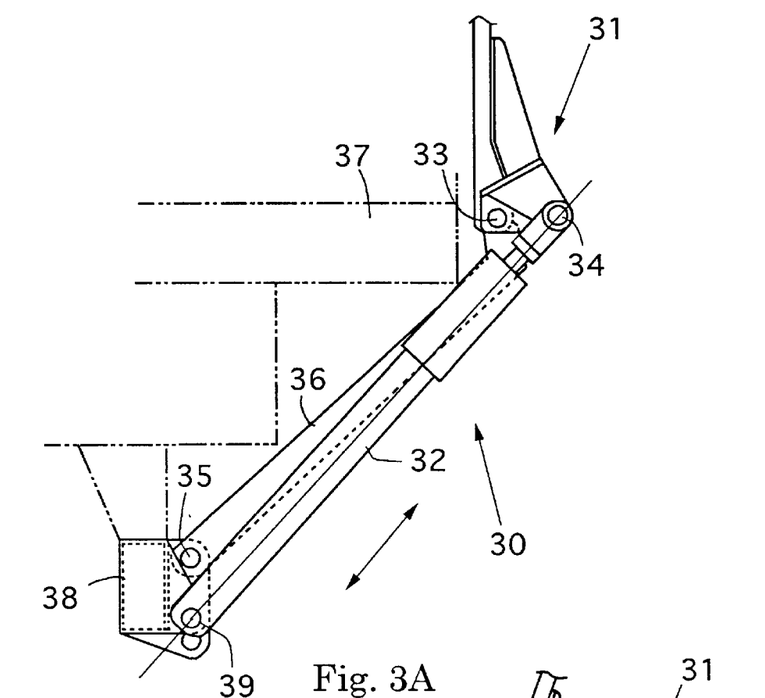
FIGS. 3A, 3B, 3C and 3D are side views of the mechanism for rotating (or tilting) the tail gate of the freight lift of the kind shown in FIGS. 2A and 2B, as the tail gate is rotated.
Figure 3B:
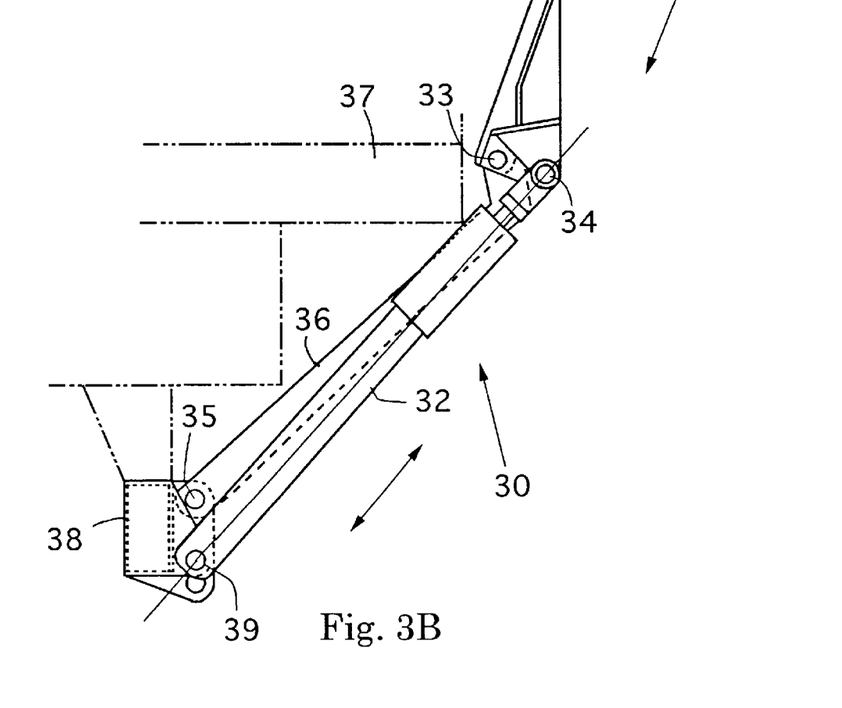
Figure 3C:
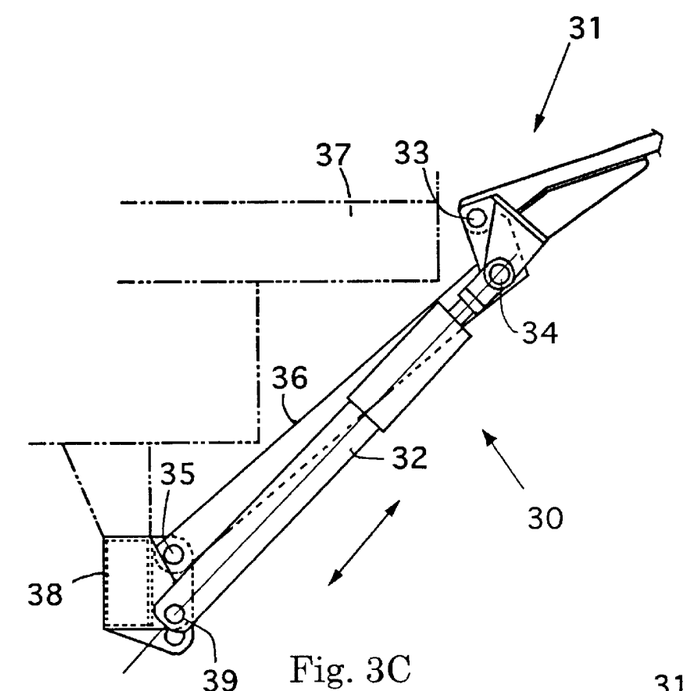
Figure 3D:
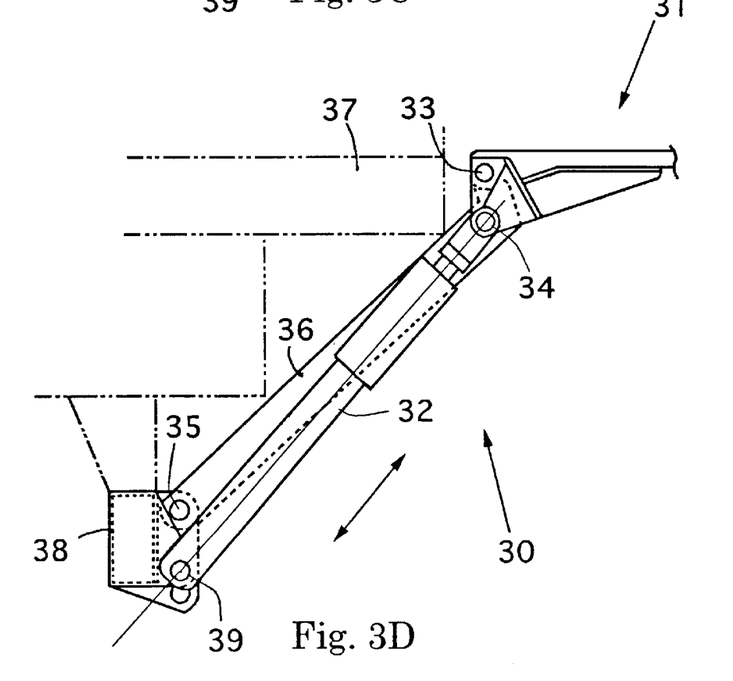

As the external switches are operated first to close the circuit and to open the tilt valve 8 and the main valve 4, the duty ratio is controlled so as to increase gradually from the initial value of 0%. The motor 5, originally at rest, begins to rotate slow, accelerating at a uniform rate and causing the tail gate to start opening from the initial position shown in FIG. 3A to the position of FIG. 3B. At time $t_1$ when the tail gate reaches the position of FIG. 3B, the duty ratio becomes 100%, the source voltage now being applied directly to the motor 5. From time $t_1$ to time $t_2$, the motor rotates at a constant speed, causing the tail gate to move from the position of FIG. 3B to that of FIG. 3C. After time $t_2$, the duty ratio is controlled to decrease such that the rotary speed of the tail gate decreases gradually as it moves from the position of FIG. 3C. When the slope angle sensor 3 detects at time $t_3$ that the tail gate is now horizontally oriented as shown in FIG. 3D, the duty ratio is set equal to 0%, both the tilt valve 8 and the main valve 4 are closed, and thereafter the entire system is stopped completely.

Figure 6:
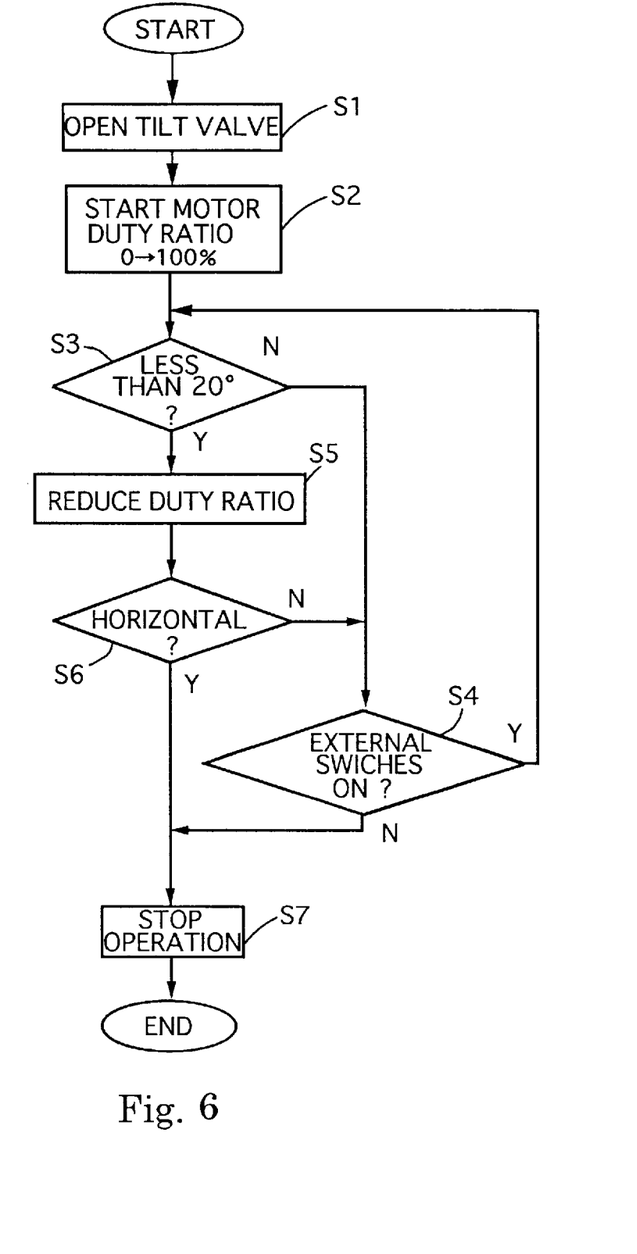
FIG. 6 is a flow chart for the process of opening the tail gate.

FIG. 6 is a flow chart showing an example of control by the system for the opening of the tail gate as described above. After the tilt valve 8 is opened (Step S1), the duty ratio is gradually increased from 0% to 100% (Step S2), and the output from the slope angle sensor 3 keeps being monitored. Until the slope angle from the horizontal reaches 20 degrees (NO in Step S3), the rotary motion of the motor at duty ratio of 100% is continued unless either of the external switches 10 and 11 is switched off (YES in Step S4 and returning to Step S3). When the slope angle sensor 3 outputs a signal indicative of the slope angle of the tail gate less than 20 degrees from the horizontal (YES in Step S3), the duty ratio for the motor 5 is reduced (Step S5) to gradually decelerate the rotary motion of the tail gate. This continues until the slope angle sensor 3 outputs a signal indicative of the tail gate being horizontal (NO in Step S6 and going to Step S4). When the tail gate becomes horizontal (YES in Step S6), as well as when either of the external switches 10 and 11 has been switched off (NO in Step 4), the system is switched off and stopped completely (Step 7).

Figure 5C:
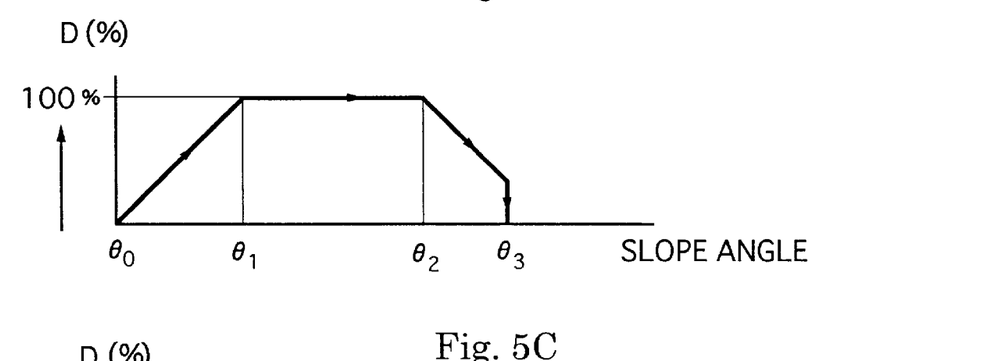

FIG. 5C schematically shows a relationship between the slope angle of the tail gate and the duty ratio of the rectangular wave signal when the tail gate is opened as described above. In FIG. 5C, $\theta_0$ represents the slope angle of the tail gate when the truck was stopped and the tail gate is about to be opened. This initial angle may not necessarily be the vertical direction, depending on whether or not the truck is parked on a flat ground. The duty ratio increases from 0% to 100% in Step S2 after the external switches are switched on in Step S1. Let $\theta_1$ be the slope angle of the tail gate when the steadily increasing duty ratio reaches 100%. With the source voltage now being applied directly to the motor 5, the tail gate continues to rotate at a constant rotary speed. Let $\theta_3$ now be the desired final slope angle of the tail gate, which is usually, but need not necessarily be, the horizontal. Another angle $\theta_2$ is pre-selected such that the difference between $\theta_2$ and $\theta_3$ is small but sufficiently large for the tail gate to decelerate gradually from the constant rotary speed of opening to zero. This difference was 20 degrees in the example described above with reference to FIG. 6. When the signal from the slope angle sensor 3 indicates that the slope angle of the tail gate has reached $\theta_2$, the duty ratio begins to decrease in Step S5 until the signal from the slope angle sensor 3 indicates that the slope angle of the tail gate has reached $\theta_3$, or that the tail gate has become horizontal, and the entire system is shut down completely in Step S7.

Thus, according to this invention, the tail gate accelerates and decelerates slowly when it begins to open from the closed position and when it is completely opened and stopped. This not only reduces damage to the cargo on the truck but also contributes to the safety of operation.

The closing of the tail gate is controlled similarly. For the completeness of description, the operation of the control system for closing the tail gate from an opened position will be presented next.

Figure 5D:
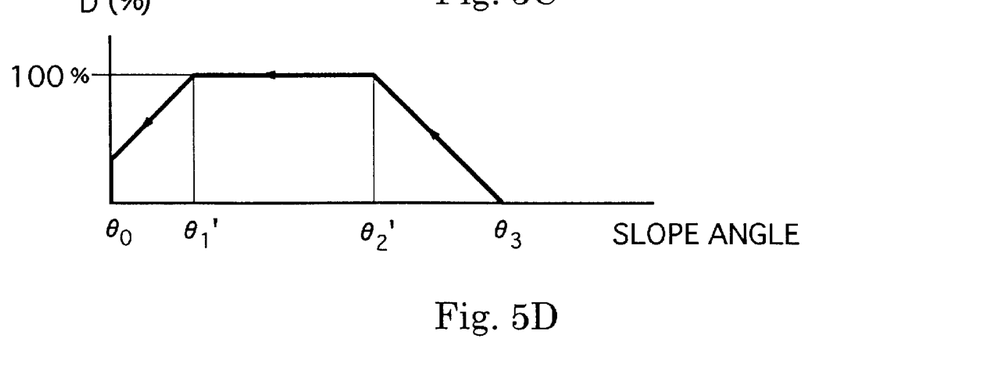
Figure 7:
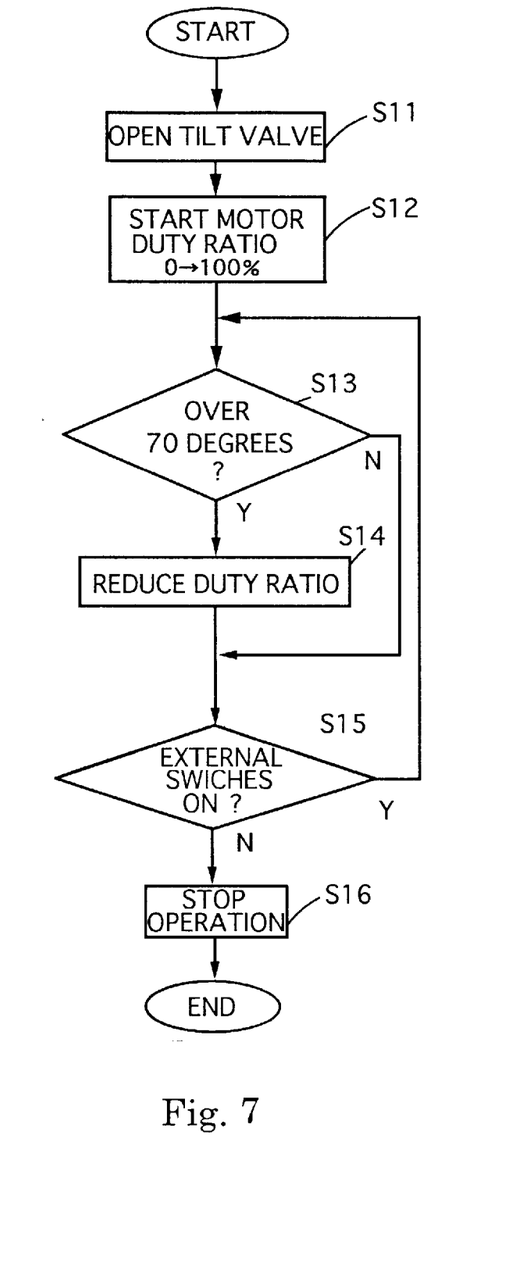
FIG. 7 is a flow chart for the process of closing the tail gate.

FIG. 7 is a flow chart showing an example of control by the system for the closing of the tail gate, and FIG. 5D schematically shows the relationship between the slope angle of the tail gate and the duty ratio of the rectangular wave signal when the tail gate is thus being closed. In FIG. 5D, too, $\theta_0$ and $\theta_3$ respectively represent the slope angle of the tail gate when it is completely closed and when it is completely open.

After the external switches 10 and 11 are operated on such that the tilt valve 8 and the main valve 4 are opened (Step S11), the duty ratio is gradually increased from 0% to 100% (Step S12), and the output from the slope angle sensor 3 is monitored. Let $\theta'_2$ now be the slope angle of the tail gate when the steadily increasing duty ratio reaches 100%. With the source voltage now being applied directly to the motor 5, the tail gate then continues to rotate at a constant rotary speed. Another angle $\theta_1$ (such as 70 degrees from the horizontal in the example of FIG. 7) is pre-selected such that the difference between $\theta_0$ and $\theta'_1$ is small but sufficiently large for the tail gate to decelerate gradually from the constant rotary speed of closing to zero. The aforementioned rotation of the tail gate at full duty is continued until the signal from the slope angle sensor indicates that the slope angle of the tail gate has reached the pre-determined angle $\theta'_1$ (Step S13), at which time the duty ratio begins to be reduced at a constant rate (Step S14) until the tail gate is completely closed. The system operation can be completely shut off (Step S16), whether the tail gate has been completely closed or not, if either of the external switches 10 and 11 is switched off (NO in Step S15).

Figure 8A:
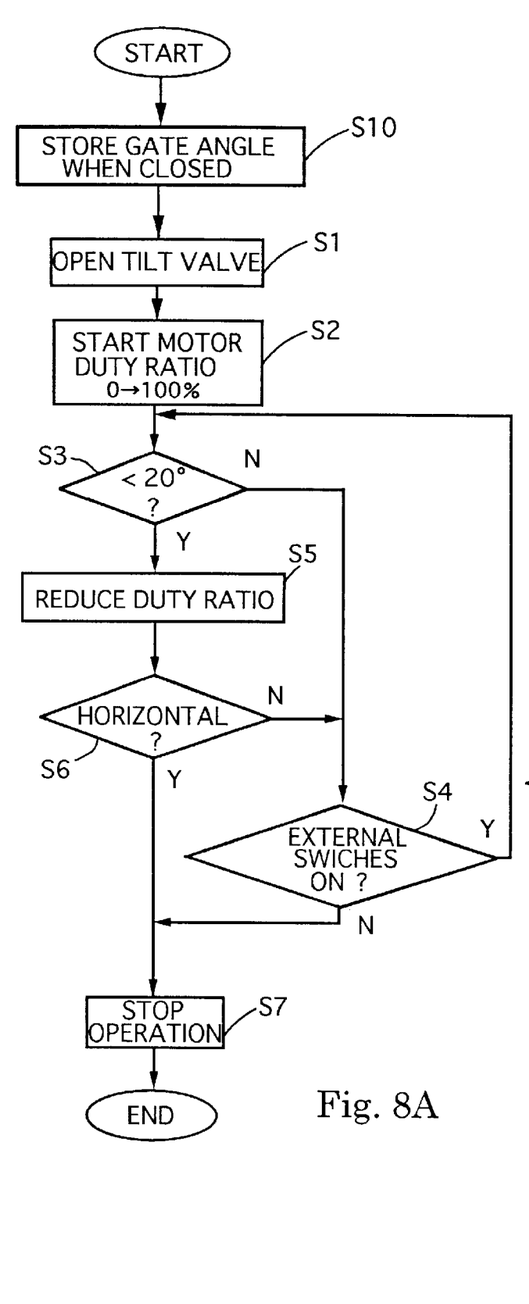
FIGS. 8A and 8B are flow charts of other processes of opening and closing the tail gate according to another embodiment of the invention.
Figure 8B:
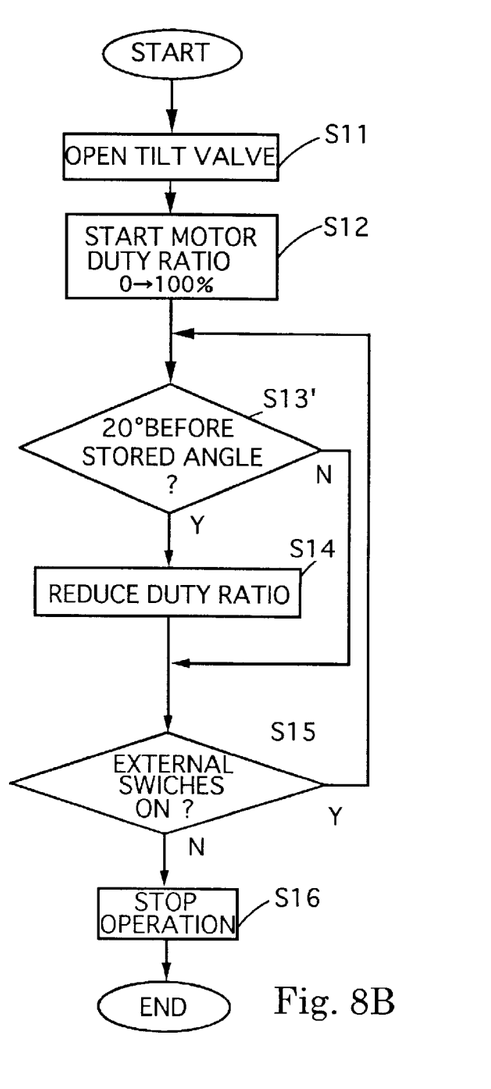

The method of control described above is not intended to limit the scope of this invention. Many modifications and variations are possible within the scope of this invention. FIGS. 8A and 8B show another method of controlling the opening and closing of the tail gate according to another embodiment of the invention, using the same numerals as in FIGS. 6 and 7 for the identical steps. The method of control shown in FIGS. 8A and 8B is different from that shown in FIGS. 6 and 7 only in that the initial slope angle of the tail gate, say, as measured by the slope angle sensor 3 when the tail gate is still completely closed at the beginning of the opening operation, is stored in the controller 7 (Step S10) and that Step S13 of FIG. 7 is replaced by different Step S13 of checking whether the slope angle of the tail gate has reached an angle which is calculated from the stored initial angle of slope, say, 20 degrees before the tail gate returns to this initial angle. This method is advantageous because the timing for beginning to decelerate the motion can be more accurately determined and hence the safety of operation can be more reliably guaranteed.

What is claimed is:

1. A control system for a lift attached to a vehicle, said lift comprising a tail gate supported by at least one hydraulic lift cylinder for lifting said tail gate up and down as a whole and by at least one hydraulic tilt cylinder for rotating said tail gate between an opened position and a closed position, said control system comprising:
    a power unit including a hydraulic pump, an electric motor for operating said hydraulic pump, and valve means for selectably allowing or not allowing transport of a hydraulic liquid into said hydraulic cylinders by said hydraulic pump;
    a sensor for measuring the slope angle of said tail gate;
    at least one external switch; and
    a controller serving to transmit output signals to said motor and to said valve means in response to input signals from said sensor and said external switch, said controller being capable of stopping rotary motion of said tail gate at a horizontal position irrespective of the slope of said vehicle and starting and stopping said rotary motion of said tail gate gradually.

2. The control system of claim 1 wherein said valve means include:
    a main valve between said hydraulic pump and each of said hydraulic cylinders;
    a tilt valve disposed between said main valve and said tilt cylinder and proximally to said tilt cylinder and directly connected to said tile cylinder; and
    a lift valve disposed between said main valve and said lift cylinder and proximally to said lift cylinder and directly connected to said lift cylinder.

3. In combination with a lift comprising a tail gate supported by at least one hydraulic lift cylinder for lifting said tail gate up and down as a whole and by at least one hydraulic tilt cylinder for rotationally opening and closing said tail gate, a controller for controlling the rotational speed of said tail gate according to the slope angle of said tail gate, said controller comprising:

a signal generating device for generating a rectangular wave signal according to an input signal received from a sensor which measured a slope angle of said tail gate; and
    a semiconductor switch which switches on and off in synchronism with said rectangular wave signal, said controller being capable of changing the duty ratio of said rectangular wave signal to adjust the speed of a motor for controlling the rotary speed of said tail gate.

4. A method of controlling an opening motion of a tail gate which is supported by at least one hydraulic lift cylinder for lifting said tail gate up and down as a whole and by at least one hydraulic tilt cylinder for rotating said tail gate; said method comprising the steps of:
    slowly starting said tail gate to rotate from a closed position and gradually increasing the rotational speed of said tail gate;
    thereafter decelerating the rotary motion of said tail gate in response to a signal from a sensor when the slope angle of said tail gate from a horizontal direction becomes less than a specified angle; and
    thereafter stopping said rotary motion of said tail gate in response to another signal from said sensor when said tail gate has become horizontal, wherein said tail gate is always stopped at said horizontal direction irrespective of the slope of a vehicle to which said tail gate is attached.

5. The method of claim 4 wherein said steps of slowly starting, gradually increasing and decelerating are effected by varying the voltage applied to a motor for driving a hydraulic pump.

6. A method of controlling a closing motion of a tail gate which is supported by at least one hydraulic lift cylinder for lifting said tail gate up and down as a whole and by at least one hydraulic tilt cylinder for rotating said tail gate; said method comprising the steps of:
    slowly starting said tail gate to rotate from an opened position and gradually increasing the rotational speed of said tail gate; and
    thereafter decelerating the rotary motion of said tail gate in response to a signal from a sensor when the slope angle of said tail gate from a horizontal direction becomes greater than a specified angle.

7. The method of claim 6 wherein said steps of slowly starting, gradually increasing and decelerating are effected by varying the voltage applied to a motor for driving a hydraulic pump.

8. A method of controlling opening and closing motions of a tail gate which is supported by at least one hydraulic lift cylinder for lifting said tail gate up and down as a whole and by at least one hydraulic tilt cylinder for rotating said tail gate; said method for said opening motion comprising the steps of:
    storing an initial slope angle of said tail gate before said opening motion is started;
    slowly starting said tail gate to rotate from a closed position and gradually increasing the rotational speed of said tail gate;
    thereafter decelerating the rotary motion of said tail gate in response to a signal from a sensor when the slope angle of said tail gate from a horizontal direction becomes less than a specified angle; and
    thereafter stopping said rotary motion of said tail gate in response to another signal from said sensor when said tail gate has become horizontal, said method for said closing motion comprising the steps of:
  slowly starting said tail gate to rotate from an opened position and gradually increasing the rotational speed of said tail gate; and
  thereafter decelerating the rotary motion of said tail gate in response to a signal from said sensor when the difference between the slope angle of said tail gate and said stored initial slope angle becomes less than a specified magnitude.

9. The method of claim 8 wherein said steps of slowly starting, gradually increasing and decelerating are effected by varying the voltage applied to a motor for driving a hydraulic pump.

* * * * *